(12) United States Patent  
Lo et al.

(10) Patent No.: US 8,774,180 B2  
(45) Date of Patent: Jul. 8, 2014

(54) TRANSPORTING MULTICAST OVER MPLS BACKBONE USING VIRTUAL INTERFACES TO PERFORM REVERSE-PATH FORWARDING CHECKS

(75) Inventors: Alton Lo, Fremont, CA (US); Arjen Boers, Sitges (ES); Ijsbrand Wijnands, Leuven (BE)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/339,953

(22) Filed: Dec. 29, 2011

(65) Prior Publication Data

US 2012/0163373 A1    Jun. 28, 2012

Related U.S. Application Data

(63) Continuation of application No. 11/204,446, filed on Aug. 16, 2005, now Pat. No. 8,089,964.

(51) Int. Cl.  
  *H04L 12/56* (2006.01)
(52) U.S. Cl.  
  USPC .......................................... 370/390; 370/231
(58) Field of Classification Search  
  USPC ......... 370/229, 230, 231, 235, 236, 249, 351, 370/389, 390, 392, 395.31, 395.5, 395.52, 370/395.53, 400, 401, 409; 709/217, 218, 709/220, 223, 225, 228, 231, 236, 238, 250  
  See application file for complete search history.

(56) References Cited

U.S. PATENT DOCUMENTS

| | | | |
|---|---|---|---|
| 6,192,051 B1 | 2/2001 | Lipman et al. | 370/389 |
| 6,466,985 B1 * | 10/2002 | Goyal et al. | 709/238 |
| 6,553,028 B1 | 4/2003 | Tang et al. | 370/389 |
| 6,680,943 B1 * | 1/2004 | Gibson et al. | 370/392 |
| 6,711,163 B1 | 3/2004 | Reid et al. | 370/390 |
| 6,728,777 B1 * | 4/2004 | Lee et al. | 709/238 |
| 6,839,348 B2 | 1/2005 | Tang et al. | 370/390 |
| 6,880,090 B1 | 4/2005 | Shawcross | 726/14 |
| 6,947,428 B1 | 9/2005 | Andersson et al. | 370/395.5 |
| 7,061,921 B1 | 6/2006 | Sheth | 370/395.52 |
| 7,260,097 B2 | 8/2007 | Casey | 370/392 |

(Continued)

OTHER PUBLICATIONS

Internetworking Technologies Handbook—Fourth Edition, Cisco Systems, Inc., Chapter 32, "MPLS", Copyright © 2004 Cisco Systems, Inc., pp. 523-538.

(Continued)

*Primary Examiner* — Edan Orgad  
*Assistant Examiner* — Curtis A Alia  
(74) *Attorney, Agent, or Firm* — Campbell Stephenson LLP

(57) ABSTRACT

A mechanism is provided in which multicast reverse path forwarding can be performed at a provider network egress edge router wherein core routers of the provider network are not configured to support multicast protocols or point-to-multipoint LSPs. An embodiment of the present invention provides for the creation of virtual interfaces in the egress edge router element during configuration of a multicast connection in response to a subscriber request. A virtual interface will be associated with an upstream ingress edge router element and that ingress edge router element is provided a label associated with the virtual interface. Such a label can then be included in datastream packets transmitted through the provider network and be used by reverse path forward checking at the egress edge router element to ascertain whether the multicast datastream is being received by the correct upstream interface.

21 Claims, 12 Drawing Sheets

(56) References Cited

U.S. PATENT DOCUMENTS

| | | | |
|---|---|---|---|
| 7,281,058 B1 | 10/2007 | Shepherd et al. | 709/238 |
| 7,339,903 B2 | 3/2008 | O'Neill | 370/313 |
| 7,522,600 B1* | 4/2009 | Aggarwal et al. | 370/390 |
| 7,529,199 B1 | 5/2009 | Wijnands et al. | 370/256 |
| 7,720,994 B2 | 5/2010 | Li | 709/238 |
| 7,966,414 B2* | 6/2011 | Cinghita et al. | 709/231 |
| 2002/0067725 A1 | 6/2002 | Oguchi et al. | 370/390 |
| 2002/0150094 A1 | 10/2002 | Cheng et al. | 370/389 |
| 2002/0186658 A1 | 12/2002 | Chiu et al. | 370/237 |
| 2003/0165140 A1 | 9/2003 | Tang et al. | 370/393 |
| 2003/0200336 A1* | 10/2003 | Pal et al. | 709/246 |
| 2003/0223372 A1 | 12/2003 | Sanchez et al. | 370/237 |
| 2003/0223402 A1* | 12/2003 | Sanchez et al. | 370/351 |
| 2004/0218536 A1* | 11/2004 | Yasukawa et al. | 370/238 |
| 2006/0007931 A1 | 1/2006 | Wright et al. | 370/392 |
| 2006/0018333 A1* | 1/2006 | Windisch et al. | 370/432 |
| 2006/0062218 A1 | 3/2006 | Sasagawa | 370/389 |
| 2006/0088031 A1* | 4/2006 | Nalawade | 370/390 |
| 2006/0120368 A1* | 6/2006 | Aboukarr et al. | 370/390 |
| 2006/0147204 A1 | 7/2006 | Yasukawa et al. | 398/26 |
| 2006/0159009 A1 | 7/2006 | Kim et al. | 370/216 |
| 2006/0221975 A1 | 10/2006 | Lo et al. | 370/395.5 |
| 2007/0058646 A1 | 3/2007 | Hermoni | 370/401 |
| 2007/0110062 A1 | 5/2007 | Balay et al. | 370/390 |
| 2007/0195778 A1 | 8/2007 | Tatar et al. | 370/392 |
| 2007/0217415 A1 | 9/2007 | Wijnands et al. | 370/390 |
| 2008/0298365 A1* | 12/2008 | Mitumori | 370/390 |

OTHER PUBLICATIONS

Internetworking Technologies Handbook—Fourth Edition, Cisco Systems, Inc., Chapter 45, "Internet Protocol Multicast", Copyright © 2004 Cisco Systems, Inc., pp. 699-718.

J. De Clercq, et al.; "Connecting IPv6 Islands Across IPv4 Clouds with BGP;" available via the Internet at http://www3.ietf.org/proceedings/02mar/I-D/draft-ietf-ngtrans-bgp-tunnel-04.txt; Jan. 2002; pp. 1-12.

Morten J. Christensen; "Multicast MPLS and Ethernet;" *The MPLS WG Archive*; available via the Internet at http://cell-relay.indiana.edu/mhonarc/mpls/2001-Oct/msg00001.html; Oct. 1, 2001; pp. 1-4.

Cao, et al.; "Multicast in MPLS/BGP IPv6 VPNs;" available via the Internet at http://tools.ietf.org/wg/ipv6/draft-cao-mcast-for-ipv6-ppvpn-00.txt; Feb. 24, 2006; pp. 1-11.

* cited by examiner

TRANSPORTING MULTICAST OVER MPLS BACKBONE USING VIRTUAL INTERFACES TO PERFORM REVERSE-PATH FORWARDING CHECKS

CROSS-REFERENCE TO RELATED APPLICATIONS

This application is a continuation of U.S. patent application Ser. No. 11/204,446, entitled "Transporting Multicast Over MPLS Backbone Using Virtual Interfaces to Perform Reverse-Path Forwarding Checks", filed Aug. 16, 2005 now U.S. Pat. No. 8,089,964, naming Alton Lo, Arjen Boers, Ijsbrand Wijnands as inventors. This application is assigned to Cisco Technology, Inc., the assignee of the present invention, and is hereby incorporated by reference, in its entirety and for all purposes.

FIELD OF THE INVENTION

This invention relates to the field of information networks, and more particularly relates to transporting a multicast datastream across the core of a multiprotocol label switching network using one or more point-to-point label switch paths.

BACKGROUND OF THE INVENTION

Today's network links carry vast amounts of information. High bandwidth applications supported by these network links include, for example, streaming video, streaming audio, and large aggregations of voice traffic. In the future, network bandwidth demands are certain to increase. As a business grows, so can its network, increasing in the number of network elements coupled to the network, the number of network links, and also geographic diversity. Over time, a business' network can include physical locations scattered throughout a city, a state, a country, or the world. Since it can be prohibitively expensive to create a private network that spans these great distances, many businesses opt to rely upon a third-party provider's network to provide connectivity between the disparate geographic sites of the business. In order for the business' network to seamlessly function through the provider network, the provider network must be able to provide a medium for transmission of all the business' various types of datastreams, including multicast transmission.

Multicast routing protocols enable multicast transmission (i.e., one-to-many connections and many-to-many connections) by replicating a multicast network packet close to the destination of that packet, obviating the need for multiple unicast connections for the same purpose; thus, saving network bandwidth and improving throughput. Upon receiving a multicast packet, a network node can examine a multicast group destination address (GDA) of the packet and determine whether one or more downstream subscribers to the multicast packet (i.e., members of the multicast group) are connected to the network node (either directly or indirectly). The network node can then replicate the multicast packet as needed and transmit the replicated packets to any connected subscribers.

FIG. 1A is a simplified block diagram of a network performing a multicast transmission. Network router elements 110, 120, 130 and 140 are coupled through network links 150, 160, and 170. Network router element 110 is also coupled to network elements 111 and 112; network router element 120 is coupled to network element 121; network router element 130 is coupled to network elements 131 and 132; and, network router element 140 is coupled to network element 141. Such coupling between the network router elements and the network elements can be direct or indirect (e.g., via a L2 network device or another network router element).

For the purposes of this illustration, network element 111 is a multicast source transmitting to a multicast group that includes network elements 112, 121, 131, 132 and 141. A multicast datastream having a group destination address to which the above network elements have subscribed as receiver members is transmitted from network element 111 to network router element 110 (illustrated by the arrow from 111 to 110). Network router element 110 determines where to forward packets in the multicast datastream by referring to an internal address table that identifies each port of network router element 110 that is coupled, directly or indirectly, to a subscribing member of the multicast group. Network router element 110 then replicates packets of the multicast datastream and then transmits the packets from the identified ports to network element 112, network router element 120 and network router element 130.

Network router elements 120 and 130 can inform network router element 110 that they are coupled to a subscriber of a multicast datastream using a network message format, such as protocol independent multicast (PIM) multicast. Using PIM, network router elements 120 and 130 can send messages indicating that they need to join (a "JOIN" message) or be excluded from (a "PRUNE" message) receiving packets directed to a particular multicast group or being transmitted by a particular source. Similarly, a network element can inform a first-hop network router element that the network element wishes to be a subscriber to a multicast group by sending a "JOIN" request through a software protocol such as internet group management protocol (IGMP). When a network element wishes to subscribe to a multicast transmission, a special IGMP protocol frame can be transmitted as a multicast "JOIN" request. An IGMP-enabled network router element (or a L2 network device) can have "snooping" software executing to read such a frame and build a corresponding entry in a multicast group address table.

Upon receipt by network router elements 120 and 130, packets from the multicast datastream will be replicated as needed by those network router elements to provide the multicast datastream to network elements coupled to those network router elements (e.g., network elements 131 and 132 or network router element 140). In this manner, a multicast datastream from network element 111 can be transmitted through a network to multiple receiving network elements. The path of such a transmission can be thought of as a tree, wherein network element 111 is the root of the tree and network elements 121, 131, 132, and 141 can be thought of as the tips of branches.

FIG. 1B is a simplified block diagram of a network in which multiple sources are transmitting to a multicast group. As in FIG. 1A, network element 111 is a source for a multicast datastream directed to a multicast group including network elements 112, 121, 131, 132, and 141. That multicast datastream is illustrated by path 180 (a solid line). Network element 132 is also transmitting a multicast datastream to the multicast group, and that datastream is illustrated by path 190 (a dashed line). In a multiple source multicast group, any subscriber network element can be a source. In order to provide this two-way routing of multicast data packets, a bi-directional version of protocol independent multicast (PIM bidir) is used to configure the network router elements in the multicast tree. In such bi-directional multicast, datastream packets are routed only along the shared bi-directional tree, which is rooted at a rendezvous point for the multicast group, rather than at a particular datastream source. Logically, a rendezvous point is an address (e.g., a network router element) that is "upstream" from all other network elements. Passing all bi-directional multicast traffic through such a rendezvous point, establishes a loop-free tree topology with a root at the rendezvous point.

FIGS. 1A and 1B illustrate transmission of multicast datastreams in a network in which the network router elements 110, 120, 130 and 140 are directly coupled with one another. But, as stated above, as a business and its network grow, a business' network can become geographically diverse, and therefore the path over which the datastream must flow can include an intervening third-party provider network.

FIG. 2 is a simplified block diagram illustrating a network configuration in which geographically diverse subnets of a business' network are coupled through a third-party provider network. The business' network includes network router elements 210, 220, 230, and 240, wherein network router element 210 is coupled to network elements 211 and 212, network router element 220 is coupled to network element 221, network router element 230 is coupled to network elements 231 and 232, and network router element 240 is coupled to network element 241. In order to connect to the providers' network, a network router element on the edge of the business' network (a customer edge router) is coupled to a network router, element on the edge of the provider's network (a provider edge router). In FIG. 2, customer edge router elements 250(1-3) are coupled to provider edge router elements 260(1-3), respectively. Network router element 240 is coupled to provider edge router element 260(4) (that is, network router element 240 is configured as a customer edge router).

It should be noted that the customer edge router and the provider edge router functionality can be provided by a single router. Further, a network router element such as 240 can also serve as an edge router. The provider edge routers provide access to the provider's network which can contain data transmission lines, network router elements, and OSI Level 2 network devices to aid in the transmission of data from one provider edge router to another provider edge router. The provider network illustrated in FIG. 2 contains, as an example, network router elements 270(1-5) and 270(r), which are coupled in a manner to permit transmission of packets through the provider network. A provider network is not limited to such a configuration, and can include any number of network router elements, transmission lines, and other L2 and L3 network devices.

In order to facilitate transmission of data through the provider network, the provider network can utilize different protocols from those used in coupled customer networks. Such provider network protocols can permit faster data transmission and routing through the network. Any needed translation between customer and provider network protocols can be performed by the edge routers. One such routing protocol that can be used by a provider network is multiprotocol label switching (MPLS).

In a typical router-based network, OSI Layer 3 packets pass from a source to a destination on a hop-by-hop basis. Transit routers evaluate each packet's Layer 3 header and perform a routing table lookup to determine the next hop toward the destination. Such routing protocols have little, if any, visibility into the network's OSI Layer 2 characteristics, particularly in regard to quality of service and link load.

To take such Layer 2 considerations into account, MPLS changes the hop-by-hop paradigm by enabling edge routers to specify paths in the network based on a variety of user-defined criteria, including quality of service requirements and an application's bandwidth needs. That is, path selection in a router-only network (Layer 3 devices) can now take into account Layer 2 attributes. In light of this dual nature, MPLS routers are called label switch routers (LSRs).

In an MPLS network, incoming datastream packets are assigned a label by an edge label switch router (e.g, provider edge router element 260(1)). An edge LSR has one or more network interfaces connected to other LSRs within the provider network and one or more other network interfaces connected to non-MPLS enabled devices (e.g., a customer edge router). The label takes the form of a header created by the edge LSR and used by LSRs within the provider network to forward packets. An LSR will create and maintain a label forwarding information base (LFIB) that indicates where and how to forward packets with specific label values. The LSRs that are within a provider's network (non-edge LSRs) are commonly called core LSRs, which switch labeled packets based on the label value in the label header. All interfaces of a core LSR are connected to other LSRs (either core or edge). The path defined by the labels through core LSRs between a pair of edge LSRs is called a label switch path (LSP). Label information is distributed among the LSRs through the use of a label distribution protocol (LDP). Packets are forwarded within the core network along the label switch path where each LSR makes forwarding decisions based solely on the contents of the label. At each hop, an LSR may strip off the existing label and apply a new label which tells the next hop how to forward the packet.

FIG. 3 is a simplified block diagram illustrating a path a datastream can take through an MPLS network. In FIG. 3, a series of LSRs (edge and core) interconnect, forming a physical path between two network elements, 390 and 395, which are connected to the MPLS network through customer edge routers 370 and 380. An Ethernet frame carrying an IP datagram generated by network element 390 will follow the standard Ethernet format with a normal Layer 2 header followed by a Layer 3 header. Because the destination address resides in a different network, customer edge router 370 forwards a packet including the IP datagram to edge LSR 310. Edge LSR 310 references its internal forwarding table (also known as a forwarding information base (FIB)) and determines that it needs to forward a packet including the IP datagram via interface 310(2) toward edge LSR 320.

The core of the MPLS network includes core LSRs 330, 340, 350, 360, which are coupled, directly or indirectly, to edge LSRs 310 and 320.

The FIB entry for the destination network in ingress edge LSR 310 indicates that edge LSR 310 must include a label with the packet to indicate what path the packet should take on its way to egress edge LSR 320 and from there to destination network element 395. The label can be inserted before the Layer 3 header in the frame passed from edge LSR 310 to the next hop core LSR 350. Core LSR 350 receives the frame at interface 350(1) and determines the presence of the label. Core LSR 350 then treats the packet according to the configuration in its label forwarding information base (LFIB), which directs the core LSR to forward the packet via interface 350(3) and to replace the old incoming label with a new outgoing label. Core LSR 360 will then handle the packet in a similar manner, receiving the packet at interface 360(1) and transmitting the packet via interface 360(4), after having stripped the label added at core LSR 350 and inserting a new label.

Edge LSR 320 is the egress point from the MPLS network for the packet. Edge LSR 320 performs a label lookup in the same way as the previous LSRs, but will have no outgoing label to use. Edge LSR 320 will then strip off all label information and pass a standard packet including the IP datagram to customer edge router 380, which will then transmit the IP frame to network element 395. It should be noted that the LSP between edge LSRs 310 and 320 can take different links than the ones indicated in FIG. 3. The table below illustrates the incoming and outgoing interface and incoming and outgoing label changes that occur at each LSR in the illustrated LSP.

TABLE 1

| Router | Incoming Label | Incoming Interface | Destination Network | Outgoing Interface | Outgoing Label |
|---|---|---|---|---|---|
| 310 | — | 310(e0) | B | 310(2) | 6 |
| 350 | 6 | 350(1) | B | 350(3) | 11 |
| 360 | 11 | 360(1) | B | 360(4) | 7 |
| 320 | 7 | 320(2) | B | 320(e0) | — |

A non-MPLS router makes a forwarding decision based on reading a Layer 3 destination address carried in a packet header and then comparing all or part of the Layer 3 address with information stored in the forwarding information base (FIB) maintained by the router. The non-MPLS router constructs the FIB using information the router receives from routing protocols. To support destination-based routing with MPLS, an LSR also is configured to use routing protocols and construct the LFIB using information the LSR receives from these protocols. An LSR must distribute, receive, and use allocated labels for LSR peers to correctly forward the frame. LSRs distribute labels using a label distribution protocol (LDP). A label binding associates a destination subnet with a locally significant label (see, e.g., Table 1). Labels are "locally significant" because they are replaced at each hop. Whenever an LSR discovers a neighbor LSR, the two LSRs establish a connection to transfer label bindings.

LDP can exchange subnet/label bindings using one of two methods: downstream unsolicited distribution or downstream-on-demand distribution. Downstream unsolicited distribution disperses labels if a downstream LSR needs to establish a new binding with its neighboring upstream LSR. In downstream-on-demand distribution, a downstream LSR sends a binding upstream only if the upstream LSR requests it. For each router in an upstream LSR's route table, the upstream LSR identifies the next hop for that route. The upstream LSR then issues a request (via LDP) to the downstream (next hop) LSR for a label binding corresponding to the downstream LSR. When the downstream LSR receives the request, the downstream LSR allocates a label, creates an entry in its LFIB with the incoming label set to the newly allocated label, and then the downstream LSR returns a binding between the newly allocated label and the route to the upstream LSR that sent the original request. When the upstream LSR receives the binding information, the upstream LSR creates an entry in its LFIB and sets the outgoing label in the entry to the value received from the downstream LSR. In a network using downstream-on-demand distribution, this process is repeated recursively until the destination is reached.

When an LSR receives a packet with a label, the LSR uses the label for an index search in the LSR's LFIB. Each entry in the LFIB consists of an incoming label (the LFIB index) and one or more subentries of the form: outgoing label, outgoing interface, and outgoing link-level information. If the LSR finds an entry with the incoming label equal to the label carried in the packet, for each component in the entry, the LSR replaces the label in the packet with the outgoing label, replaces link level information (such as the MAC address) in the packet with the outgoing link-level information, and forwards the packet over the outgoing interface. This forwarding decision uses an exact-match algorithm using a fixed-length, fairly short (as composed to an L3 address) label as an index. Such a simplified forwarding procedure enables a higher forwarding performance, and can be implemented in LSR hardware rather than software.

As stated above, provider networks may not operate under the same protocols as do the coupled customer networks. Provider networks can operate, for example, using IPv4 using MPLS, while a customer network can use IPv6, IPv4, or another networking protocol. It is desirable to transmit multicast packets originating in an IPv6 or IPv4 customer network through a provider network. Such transmission can occur by creating multiple point-to-point LSPs through an MPLS network originating at the edge router coupled, directly or indirectly, to the multicast source. However, MPLS networks do not permit standard multicast routing checking such as reverse path forwarding (described more fully below). Therefore, a mechanism is needed to permit such multicast routing checking without the need for upgrading provider core networks to provide IPv6 or point-to-multipoint LSPs.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Figure 1A:
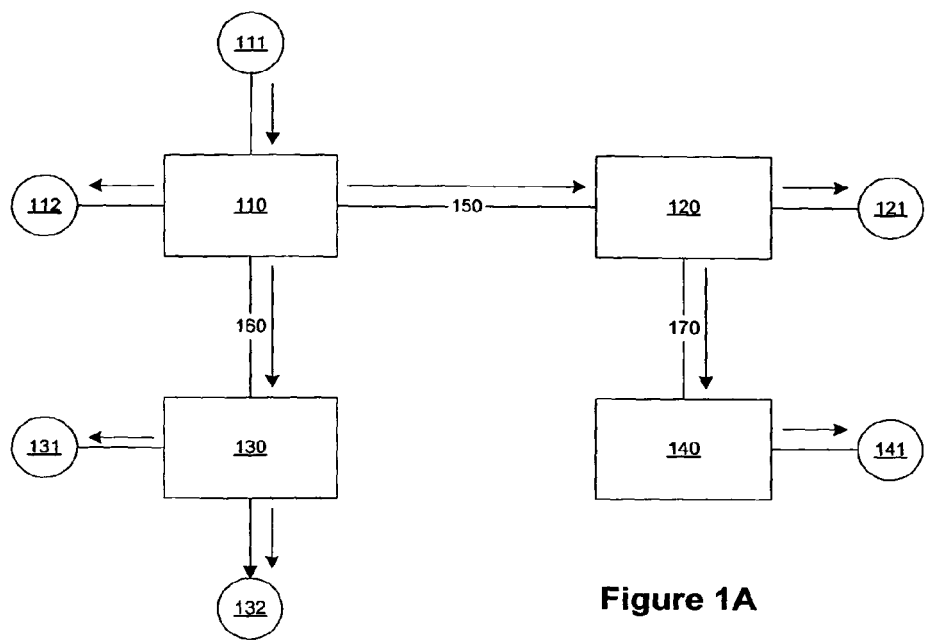
FIG. 1A is a simplified block diagram of a network performing a multicast transmission.
Figure 1B:
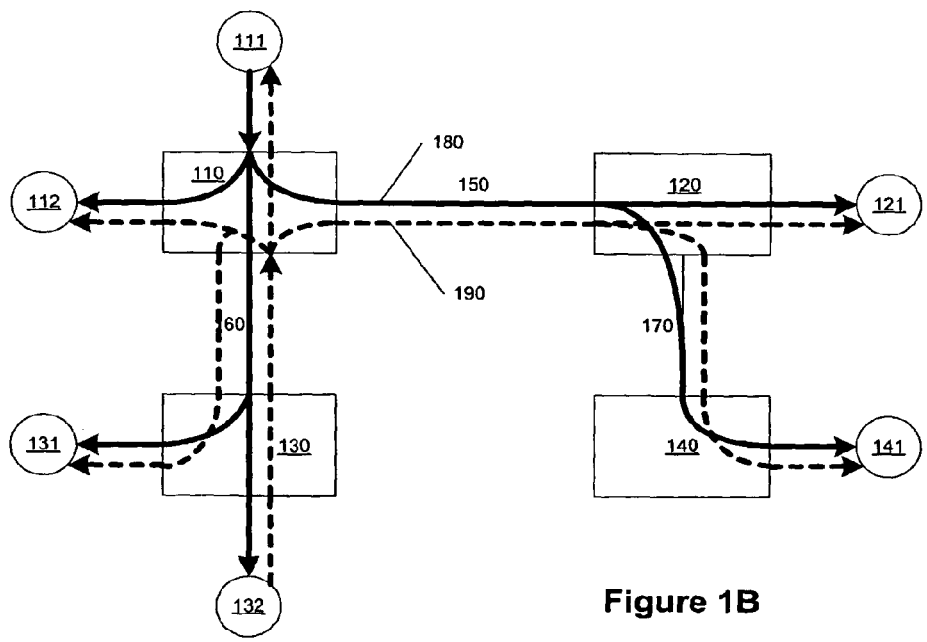
FIG. 1B is a simplified block diagram of a network in which multiple sources are transmitting to a single multicast group.
Figure 2:
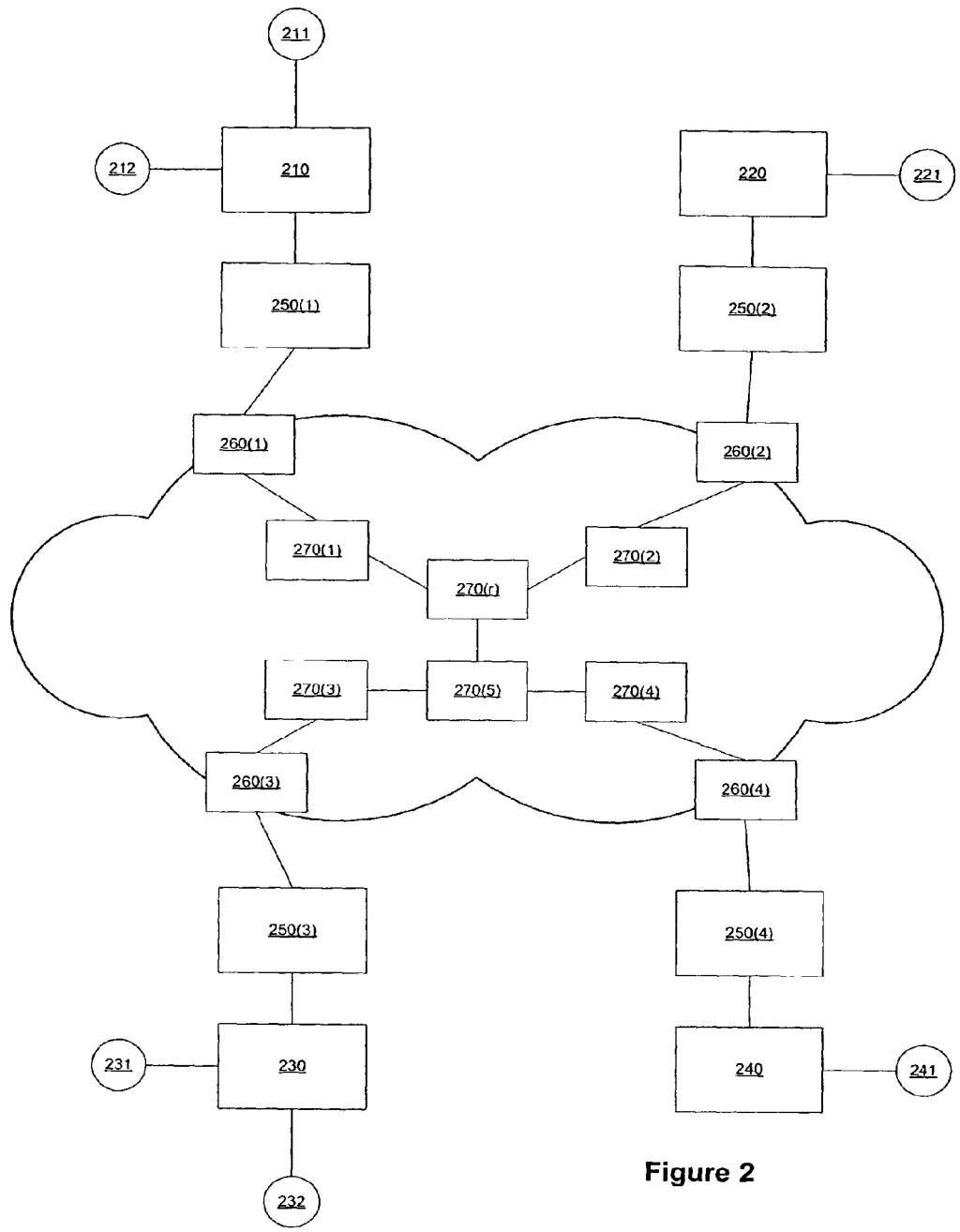
FIG. 2 is a simplified block diagram illustrating a network configuration in which geographically diverse subnets of a business' network are coupled through a third-party provider network.
Figure 3:
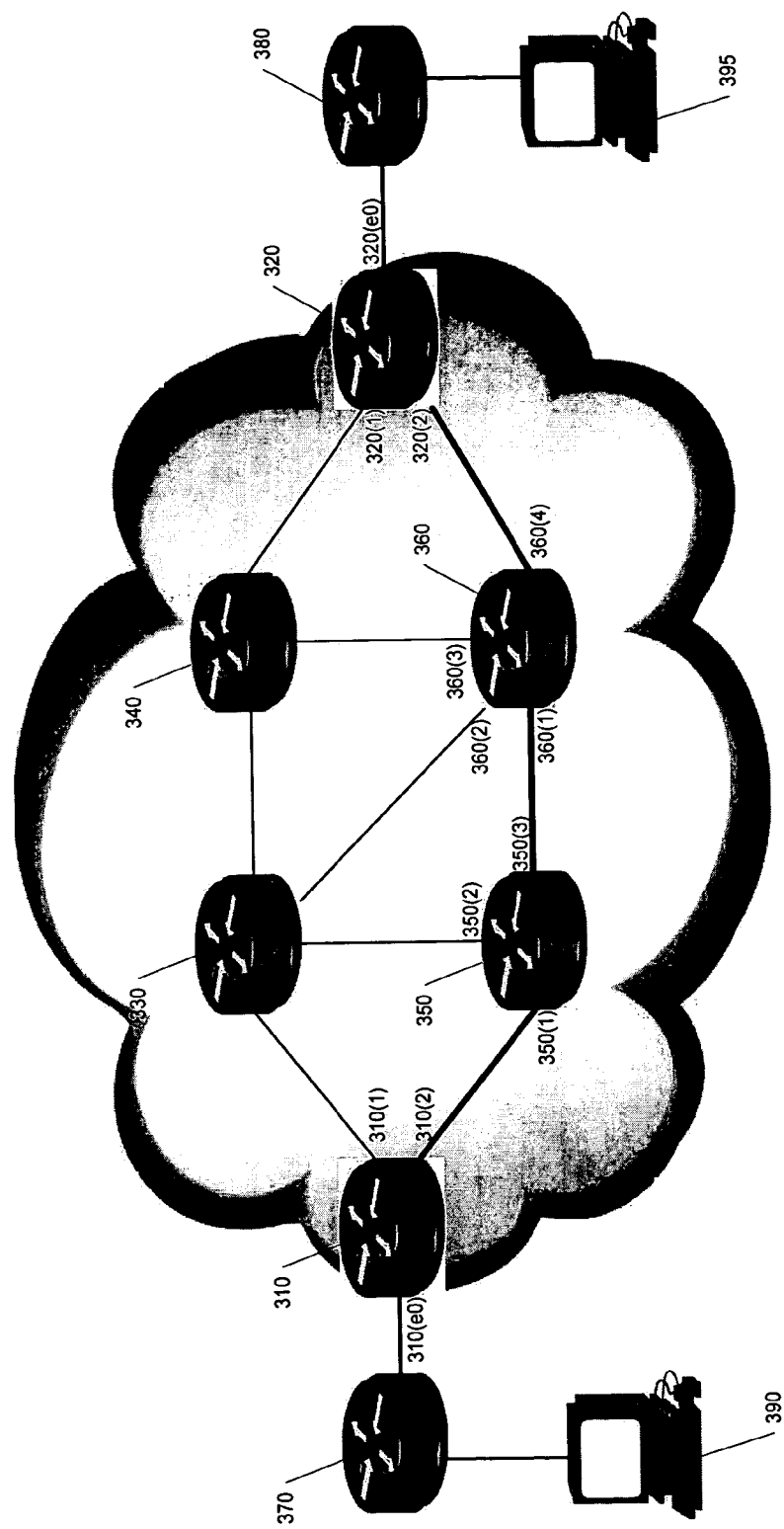
FIG. 3 is a simplified block diagram illustrating a datastream path through an MPLS network.

The present invention provides a mechanism in which multicast reverse path forwarding can be performed at an egress edge router element in a provider network wherein the core routers of the network are not configured to support multicast protocols or point-to-multipoint LSPs. An embodiment of the present invention provides for the creation of virtual interfaces in the egress edge router element while configuring a multicast connection in response to a subscriber request. A virtual interface will be associated with an upstream ingress edge router element and that ingress edge router element will be provided a label associated with the virtual interface. Such a label can then be included in datastream packets transmitted through the provider network. The label can then be used by reverse path forward checking in the egress edge router element to verify that the multicast datastream is being received by the correct interface (e.g., the virtual interface associated with the ingress edge router element). In such a manner, core network router elements of the provider's network need not be configured to process multicast transmissions as such, nor need the core router elements be configured to use the same network protocols as those used by the customer networks (e.g., customer networks can use IPv6 while the core network routers can use IPv4).

In multicast routing, a multicast source sends traffic to a group of hosts represented by a multicast group address. A network router element that is processing a multicast datastream must determine which direction is upstream (e.g., toward the source of the multicast datastream) and which direction or directions are downstream. If there are multiple downstream paths, the network router element will replicate the packet and forward the traffic down the appropriate downstream paths. This concept of forwarding multicast traffic away from the source, rather than to the receiver, is called reverse path forwarding (RPF).

RPF enables network router elements to correctly forward multicast traffic down a multicast distribution tree. RPF makes use of the existing forwarding information base (FIB) to determine the upstream and downstream neighbors. A network router element forwards a multicast packet only if it is received on the upstream interface. This RPF check helps to guarantee that the distribution tree will be loop-free.

A network router element will perform an RPF check on a packet in a multicast datastream, when the packet arrives at the network router element. If the RPF check is successful, the packet is forwarded; otherwise, it is dropped. For a multicast datastream packet, an RPF check is as follows: (1) a network router element looks up the source address of the packet in the FIB to determine whether the packet arrived at an interface that is on the reverse path back to the source; (2) if the packet did arrive on the interface leading back to the source, the RPF check is successful and the packet is forwarded; and (3) if the RPF check fails, the packet is dropped. A network router element uses the FIB to determine the interface on which the network router element would transmit a packet to the source of the multicast datastream.

Figure 4:
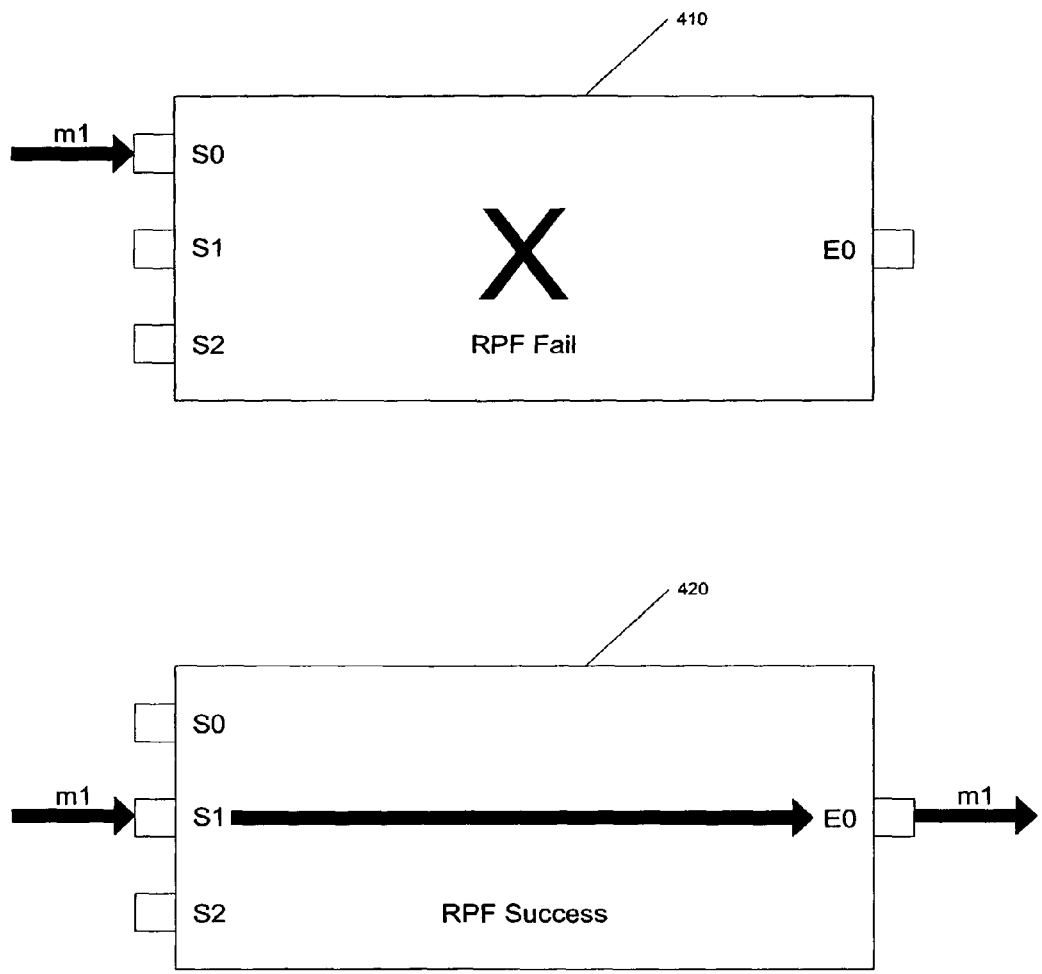
FIG. 4 is a simplified block diagram illustrating RPF check failure and success scenarios.

FIG. 4 is a simplified block diagram illustrating RPF check failure and success scenarios. Network router elements 410 and 420 are illustrated receiving a multicast transmission from a source *m*1. In both network elements 410 and 420, the FEB indicates that *m*1 is coupled to interface S1. Network router element 410 receives the multicast transmission at interface S0; therefore, the RPF check on that datastream fails and packets in that datastream are dropped. Network router element 420 receives the multicast transmission at interface S1; thus, the RPF check succeeds and network router element 420 forwards the datastream packets via interface E0.

Figure 5:
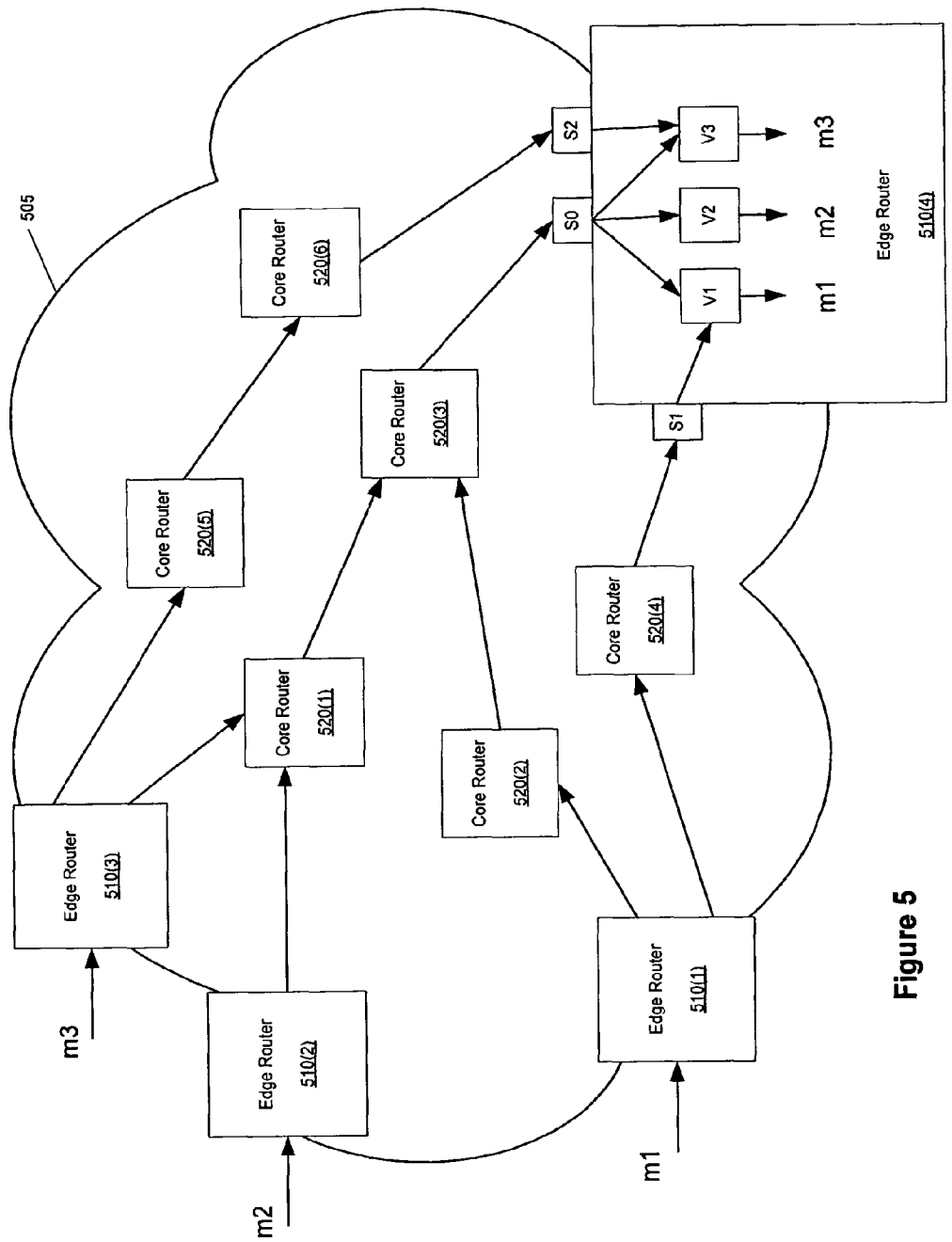
FIG. 5 is a simplified block diagram illustrating paths that three different multicast datastreams can take through an MPLS network between ingress edge router elements and an egress edge router element in accord with one embodiment of the present invention.

FIG. 5 is a simplified block diagram illustrating paths that three different multicast datastreams, m1, m2 and m3, can take through an MPLS network 505 between ingress edge router elements 510(1), 510(2) and 510(3) and an egress edge router element 510(4). Since an MPLS network can take into account such factors as quality of service and load balancing when determining a label switch path between an ingress edge router element and an egress edge router element, packets from a particular multicast datastream may not always arrive at the same interface on the egress edge router element. As an example, multicast datastream m1 arriving at ingress edge router element 510(1) can traverse either core router element 510(2) and 520(3) en route to interface S0 on egress edge router element 510(4) or the multicast datastream can traverse core router element 520(4) en route to interface S1 on egress edge router element 510(4). Similarly, packets from multicast datastream m3 arriving at ingress edge router element 510(3) can traverse either core router elements 520(1) and 520(3) en route to interface S0 on edge router element 510(4) or the packets can traverse core router elements 520(5) and 520(6) en route to interface S2 on egress edge router element 510(4). Given this uncertainty as to the arrival interface on the egress edge router element and given that the core network router elements may not be configured to process multicast protocol such as PIM, an alternative system is necessary to identify the origin of an incoming multicast datastream so that an RPF check can be performed.

According to one embodiment of the present invention, tracking the origin of a multicast datastream through an MPLS network (i.e., the ingress edge router element) can be performed by creating a virtual interface at the egress edge router element. The virtual interface can be associated with the ingress edge router element. A label can be associated with the virtual interface and then provided to the ingress edge router element. The ingress edge router element can then associate the label with packets of the multicast datastream (that is, include the label with packets of the multicast datastream) before transmitting the packets through the core network. The egress edge router element can then examine the label to determine which virtual interface a packet should be associated with, and then an RPF check can be performed to determine whether the packet is associated with the appropriate virtual interface. Due to its role in facilitating RPF checking, the label is called an RPF-label. Note that the RPF-label is a second label associated with each multicast packet in a datastream transmitted from the ingress edge router element to the egress edge router element in addition to any label used for transmission through the MPLS network.

Virtual interfaces v1, v2 and v3, are illustrated in egress edge router 510(4) of FIG. 5. Arrows indicate how multicast datastreams initiating from the various ingress edge router elements can be associated with the virtual interfaces regardless of the physical interface, S0, S1 or S2, on which the datastream arrives.

Figure 6:
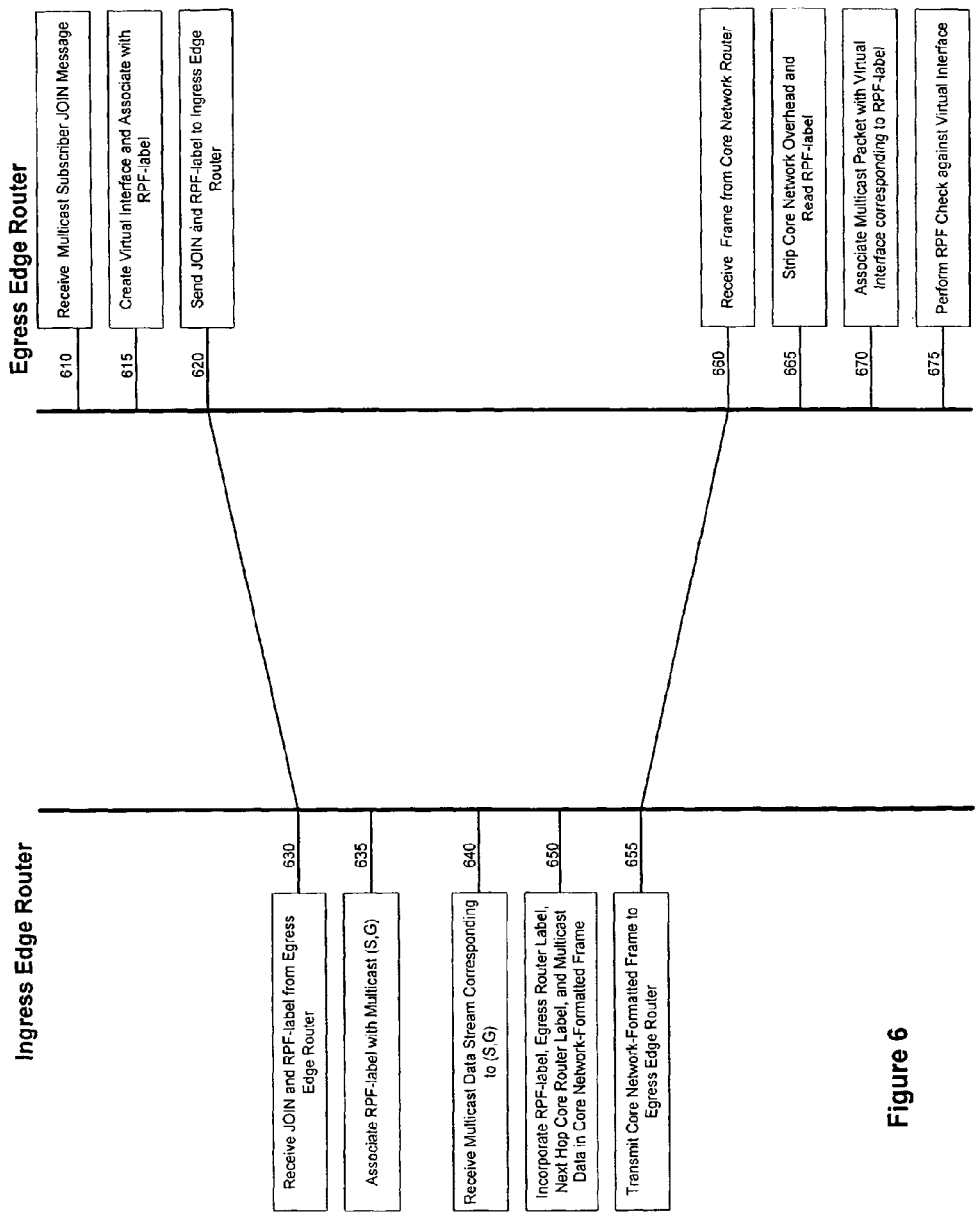
FIG. 6 is a timing diagram illustrating steps that can be performed by an egress edge router and an ingress edge router in configuring and using virtual interfaces for RPF checks in accord with one embodiment of the present invention.

FIG. 6 is a timing diagram illustrating steps that can be performed by an egress edge router and an ingress edge router in configuring and using virtual interfaces for RPF checks. An egress edge router element receives a multicast subscriber JOIN message (610). Such a JOIN message can be an IGMP or PIM protocol message. In response to the multicast subscriber JOIN message, the egress edge router element creates a virtual interface and associates that virtual interface with an RPF-label (615). The virtual interface is further associated with an ingress edge router element determined by the egress edge router element to be the next-hop edge router element toward the source of the requested multicast datastream. Such a determination can be made by the egress edge router element referring to its FIB for the network associated with the source. The egress edge router element then sends a JOIN message and the RPF-label to the next-hop ingress edge router element (620). The ingress edge router element can receive the JOIN and RPF label from the egress edge router element (630), and can associate the RPF-label with the requested multicast source and group destination address to be included in multicast packets transmitted to the corresponding egress edge router element (635).

When the ingress edge router element receives a multicast datastream (640), the ingress edge router element can then perform a lookup in a forwarding table to determine those egress edge router elements to which it must transmit datastream packets and replicates the multicast datastream packets as necessary (645). The ingress edge router element can then include the RPF-label, an egress router label, a next-hop core router element label, and the replicated multicast packet in a core network-formatted frame (650). The core network-formatted frame can then be transmitted toward the egress edge router element via the next-hop core network router element within the MPLS network (655).

The egress edge router element will ultimately receive the multicast packet from its neighboring core network router element (660). The egress edge router element can then strip the core network overhead and read the RPF-label (665). Using the RPF-label, the egress edge router element will associate the multicast packet with a virtual interface corresponding to the RPF-label (670). The egress edge router element then performs an RPF check against the identified virtual interface (675) and forwards or drops the frame as indicated by the results of the RPF check.

This manner of encapsulating multicast data and the RPF-label within a frame formatted for the core network obviates the need for the core network to perform operations specific to multicast. Only the edge router elements need be able to handle multicast operations such as replication. The ingress edge router elements will provide the core network with the datastream in a format that the core network router elements can properly forward and the egress edge router elements will de-encapsulate the data within the core network frames. Since the multicasting is handled by the ingress edge router element, only point-to-point LSPs are configured within the core network.

Figure 7:
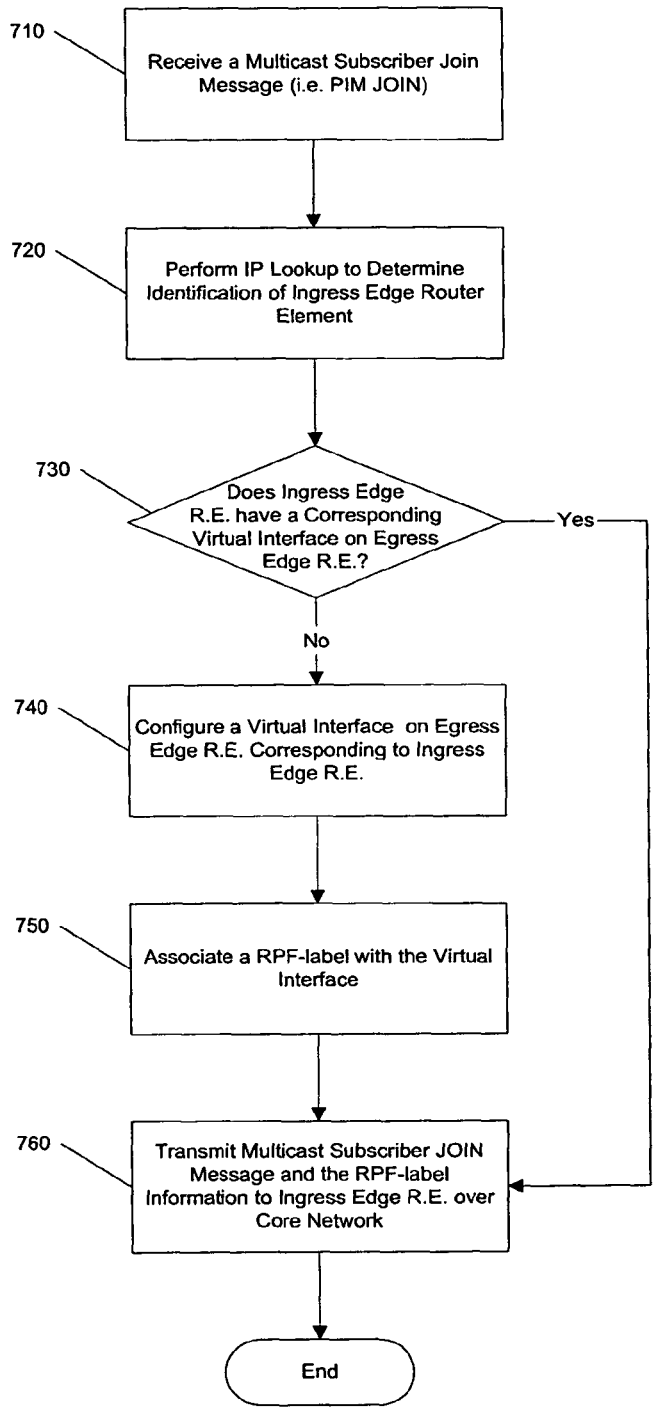
FIG. 7 is a simplified flow diagram illustrating tasks that can be performed by an egress router element in configuring a virtual interface in accord with one embodiment of the present invention.

FIG. 7 is a simplified flow diagram illustrating tasks that can be performed by an egress router element in configuring a virtual interface. The egress router element receives a multicast subscriber JOIN message (710). The egress router element performs a lookup in its IP table to identify the next-hop ingress edge router element toward the multicast source indicated in the JOIN message (720). The egress edge router element determines whether the ingress edge router element already has an associated virtual interface configured on the egress edge router element (730). If a corresponding virtual interface is already configured, then the egress edge router element transmits a JOIN and the RPF-label information to the ingress edge router element through the core network (760). If an associated virtual interface is not already configured, then the egress edge router element configures a virtual interface on the egress edge router element corresponding to the ingress edge router element (740). The egress edge router element can then associate an RPF-label with the virtual interface (750). The multicast subscriber JOIN message and the RPF label information can further be transmitted to the ingress edge router element via the core network (760).

Figure 8:
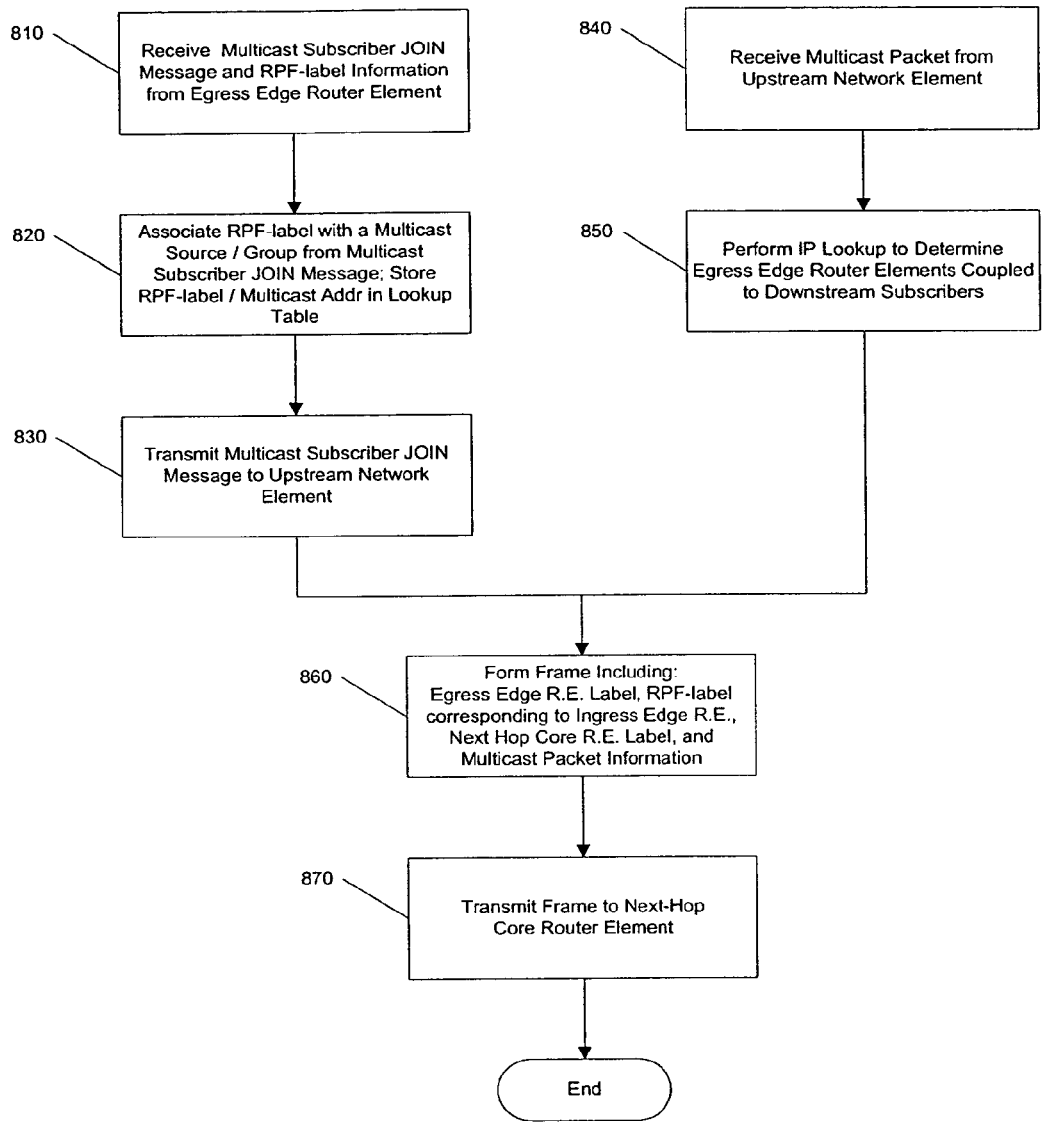
FIG. 8 is a simplified flow diagram of steps that can be performed on an ingress edge router element both in response to a multicast subscriber JOIN message and to receiving a multicast packet from an upstream network element in accord with one embodiment of the present invention.

FIG. 8 is a simplified flow diagram of steps that can be performed on an ingress edge router element both in response to receiving a multicast subscriber JOIN, message and to receiving a multicast packet from an upstream network element according to, one embodiment of the present invention. The ingress edge router element can receive a multicast subscriber JOIN message and RPF-label information from the egress edge router element (610). The RPF-label can be associated with a multicast source/group identified in the multicast subscriber JOIN message (620), and the RPF-label and multicast address can be stored in a lookup table stored in the ingress edge router element. The ingress edge router element can then transmit the multicast subscriber JOIN message to a next-hop upstream network element (630).

The ingress edge router element can also receive a multicast datastream from the upstream network element (840). The ingress edge router element can then perform an IP lookup to determine which egress edge router elements are coupled to downstream subscribers of the multicast datastream (850). The ingress edge router element can then replicate multicast datastream packets as necessary, forming packets for the core network by including a label for the egress edge router element, an RPF-label corresponding to the ingress edge router element, a label for the next-hop core router element, and the information in the multicast packets (860). The ingress edge router element can then transmit the packets to the next-hop core network router element (870) en route to the next-hop egress edge router element.

Figure 9:
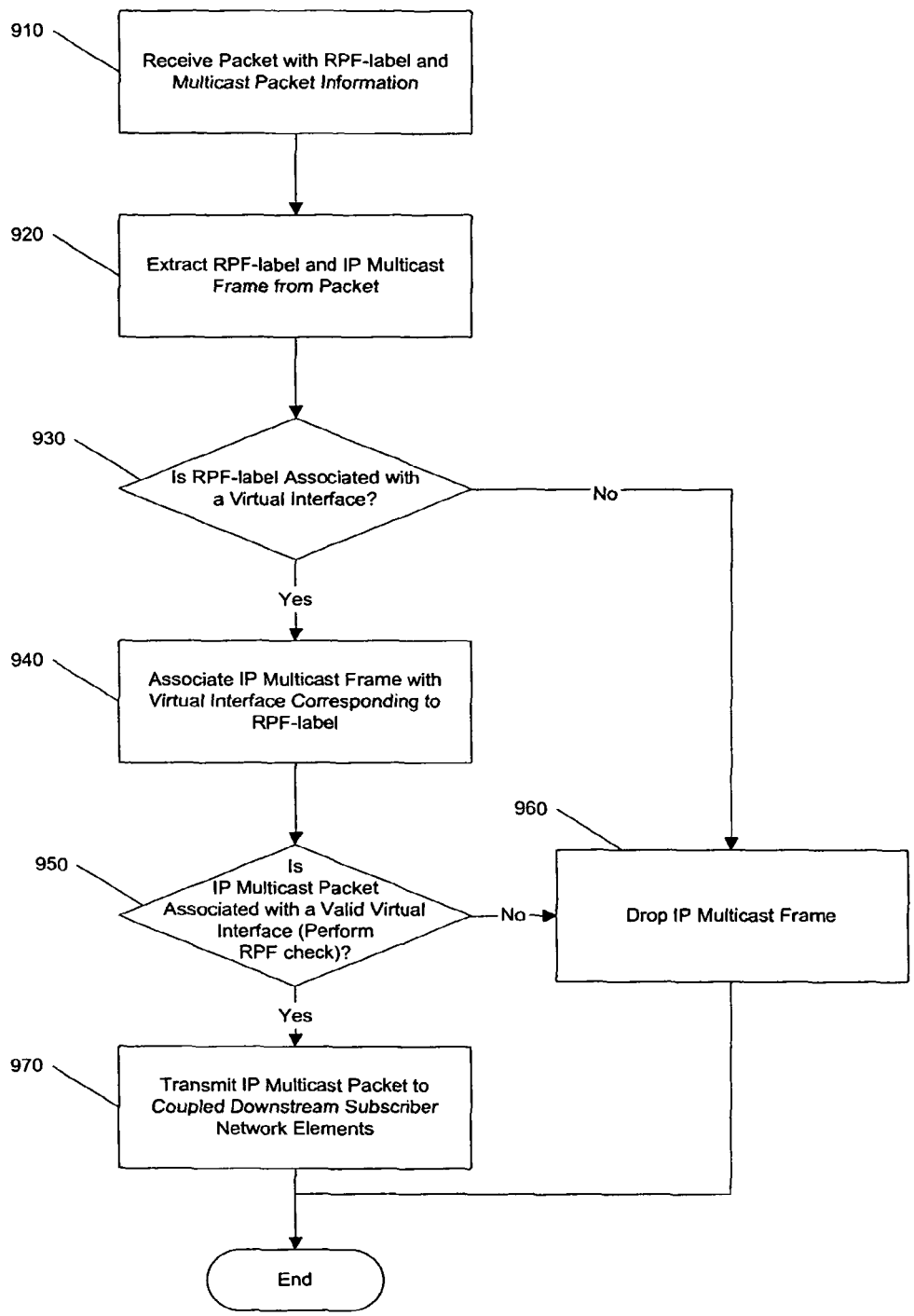
FIG. 9 is a simplified flow diagram illustrating an RPF check procedure performed by an egress edge router element in accord with one embodiment of the present invention.

FIG. 9 is a simplified flow diagram illustrating an RPF check procedure performed by an egress edge router element in accord with one embodiment of the present invention. The egress edge router element will receive a frame from a neighboring core network router element, wherein the frame contains RPF-label and multicast packet information (910). The egress edge router element will extract the RPF label and multicast packet information from the frame (920), and will analyze the RPF-label. The egress edge router element will determine whether the RPF-label is associated with the virtual interface on the egress edge router element (930), and if not associated with a virtual interface the egress edge router element will drop the multicast packet (960). If the RPF-label is associated with a virtual interface, then the egress edge router element will associate the multicast packet with the corresponding virtual interface (940). The egress edge router element will then determine whether the multicast packet is associated with a valid virtual interface for the source of the multicast datastream (i.e., the egress edge router element will perform an RPF check) (950). If not associated with a valid virtual interface, the egress edge router element will drop the multicast packet (960). If the multicast packet passes the RPF check, then the egress edge router element will transmit the multicast packet to the appropriate downstream subscriber network elements as determined by a lookup in the IP routing tables of the egress edge router element (970).

An MPLS network uses a hierarchical labeling structure. That is, different levels of labels can be associated with each frame transiting through a core network. This hierarchical label structure can be taken advantage of by the present invention by including the RPF-label in one of the layers of the label hierarchy associated with a frame. This will permit the present invention to be implemented in an MPLS network without the need for upgrading or modifying the core network element routers of an existing MPLS network. Only the edge router elements need be modified to implement embodiments of the present invention.

An Example Computing and Network Environment

Figure 10:
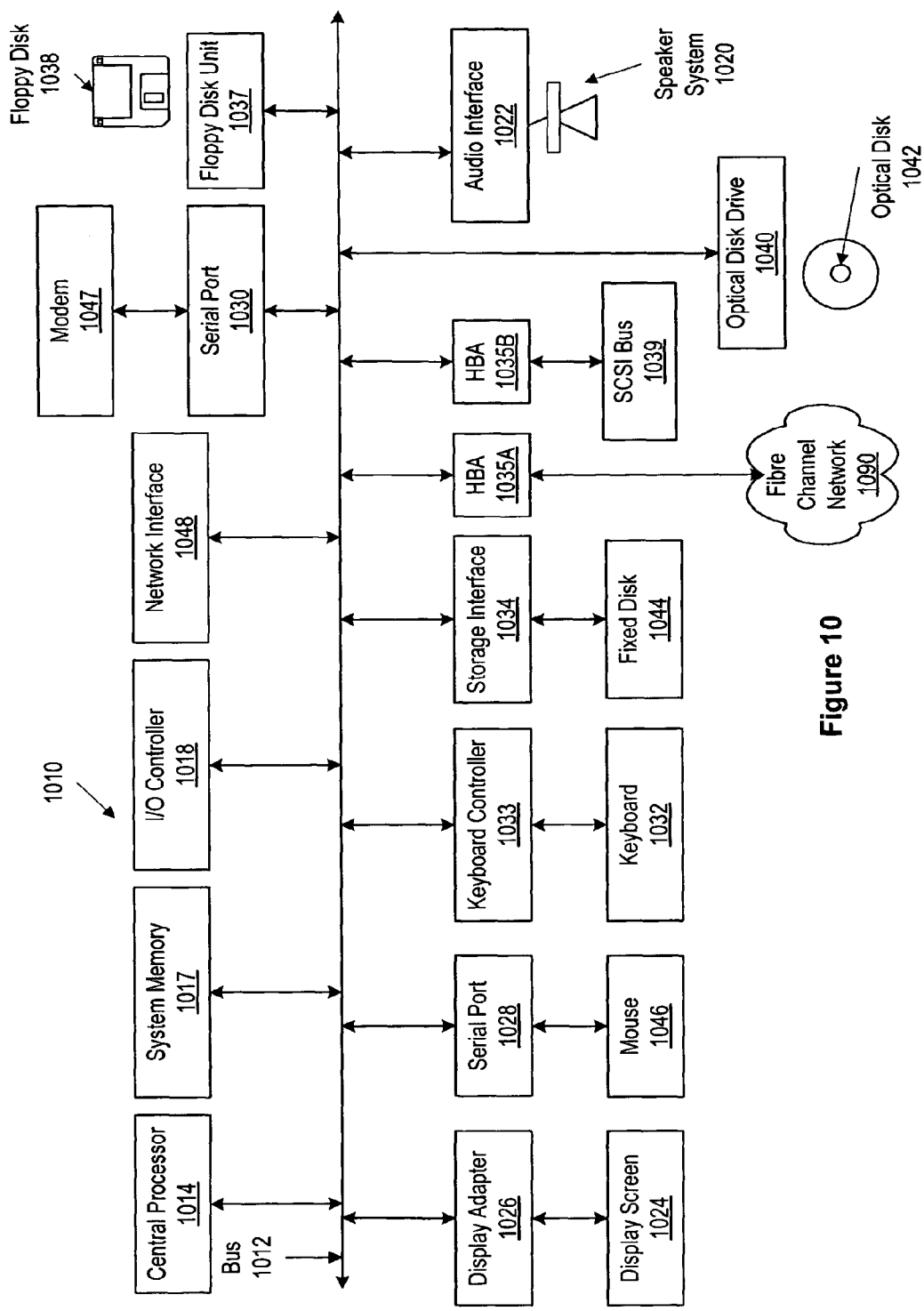
FIG. 10 is a block diagram depicting a computer system suitable for implementing embodiments of the present invention.

FIG. 10 depicts a block diagram of a computer system 1010 suitable for implementing the present invention. Computer system 1010 includes a bus 1012 which interconnects major subsystems of computer system 1010, such as a central processor 1014, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), a storage interface 1034, a floppy disk drive 1037 operative to receive a floppy disk 1038, a host bus adapter (HBA) interface card 1035A operative to connect with a fibre channel network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1028), a modem 1047 (coupled to bus 1012 via serial port 1030), and a network interface 1048 (coupled directly to bus 1012).

Bus 1012 allows data communication between central processor 1014 and system memory 1017, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1010 are generally stored on and accessed via a computer readable medium, such as a hard disk drive (e.g., fixed disk 1044), an optical drive (e.g., optical drive 1040), a floppy disk unit 1037, or other storage medium.

Storage interface 1034, as with the other storage interfaces of computer system 1010, can connect to a standard computer readable medium for storage and/or retrieval of information, such as a fixed disk drive 1044. Fixed disk drive 1044 may be a part of computer system 1010 or may be separate and accessed through other interface systems. Modem 1047 may provide a direct connection to a remote server via a telephone link or to the Internet via an internet service provider (ISP). Network interface 1048 may provide a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, all of the devices shown in FIG. 10 need not be present to practice the present invention. The devices and subsystems can be interconnected in different ways from that shown in FIG. 10. The operation of a computer system such as that shown in FIG. 10 is readily known in the art and is not discussed in detail in this application. Code to implement the present invention can be stored in computer-readable storage media such as one or more of system memory 1017, fixed disk 1044, optical disk 1042, or floppy disk 1038. Additionally, computer system 1010 can be any kind of computing device using an operating system that provides necessary data access features and capabilities.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 11:
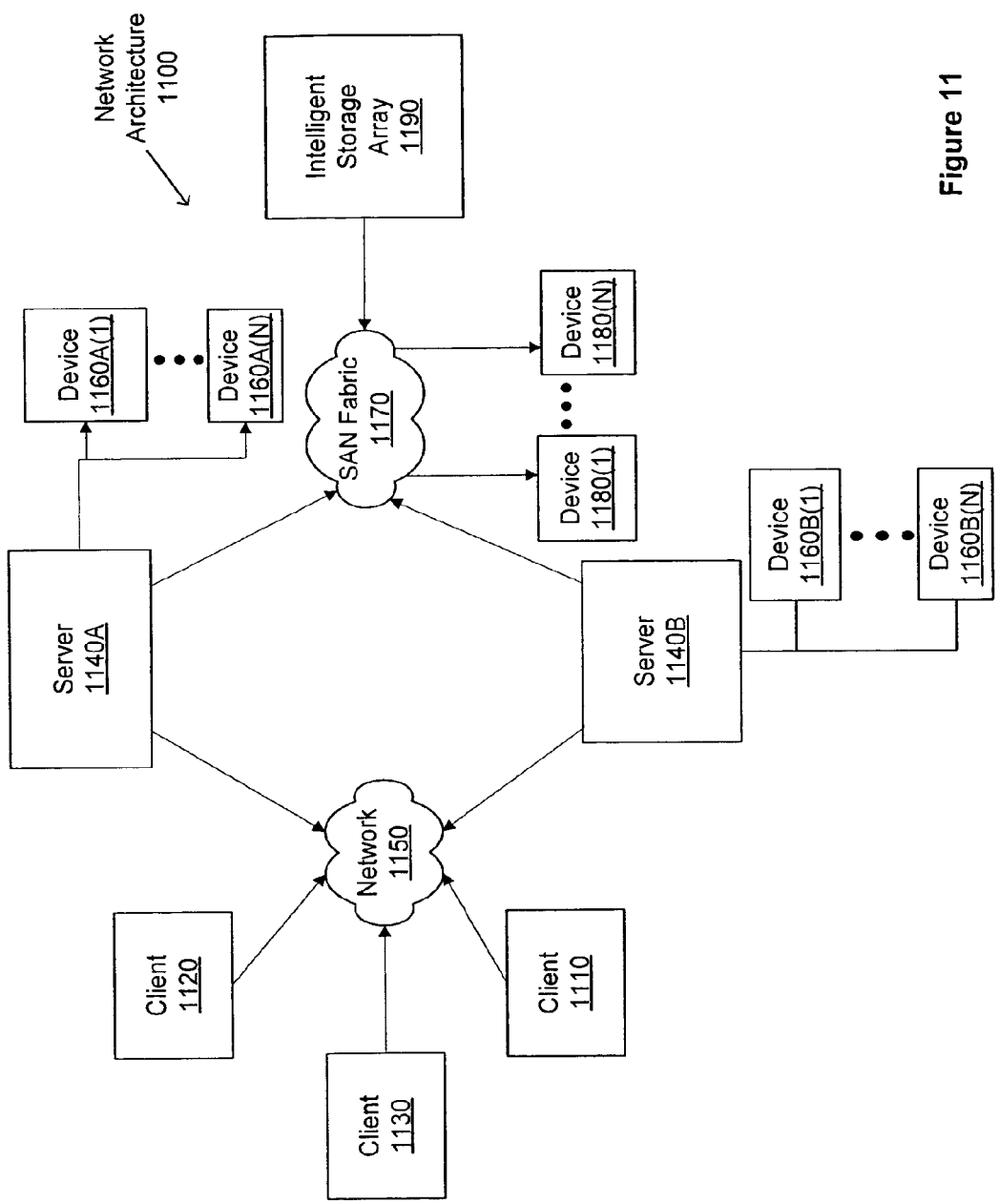
FIG. 11 is a block diagram depicting a network architecture suitable for implementing embodiments of the present invention.

FIG. 11 is a block diagram depicting a network architecture 1100 in which client systems 1110, 1120 and 1130, as well as storage servers 1140A and 1140B (any of which can be implemented using computer system 1010), are coupled to a network 1150. Storage server 1140A is further depicted as having storage devices 1160A(1)-(N) directly attached, and storage server 1140B is depicted with storage devices 1160B(1)-(N) directly attached. Storage servers 1140A and 1140B are also connected to a SAN fabric 1170, although connection to a storage area network is not required for operation of the invention. SAN fabric 1170 supports access to storage devices 1180(1)-(N) by storage servers 1140A and 1140B, and so by client systems 1110, 1120 and 1130 via network 1150. Intelligent storage array 1190 is also shown as an example of a specific storage device accessible via SAN fabric 1170.

With reference to computer system 1010, modem 1047, network interface 1048 or some other method can be used to provide connectivity from each of client computer systems 1110, 1120 and 1130 to network 1150. Client systems 1110, 1120 and 1130 are able to access information on storage server 1140A or 1140B using, for example, a web browser or other client software (not shown). Such a client allows client systems 1110, 1120 and 1130 to access data hosted by storage server 1140A or 1140B or one of storage devices 1160A(1)-(N), 1160B(1)-(N), 1180(1)-(N) or intelligent storage array 1190. FIG. 11 depicts the use of a network such as the Internet for exchanging data, but the present invention is not limited to the Internet or any particular network-based environment.

An Example Router

Figure 12:
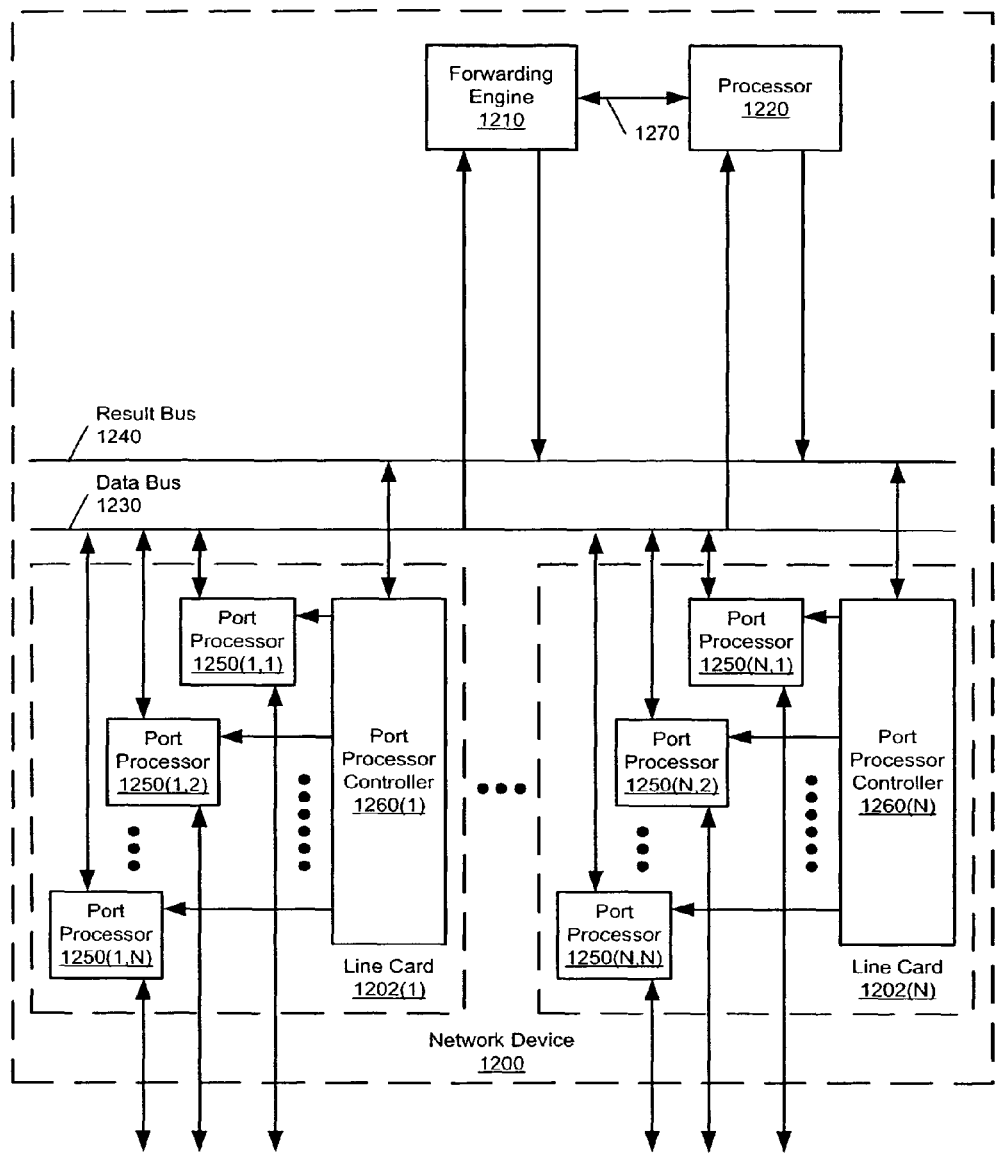
FIG. 12 is a block diagram depicting a network router element suitable for implementing embodiments of the present invention.

FIG. 12 is a block diagram illustrating a network router element. In this depiction, network router element 1200 includes a number of line cards (line cards 1202(1)-(N)) that are communicatively coupled to a forwarding engine 1210 and a processor 1220 via a data bus 1230 and a result bus 1240. Line cards 1202(1)-(N) include a number of port processors 1250(1,1)-(N,N) which are controlled by port processor controllers 1260(1)-(N). It will also be noted that forwarding engine 1210 and processor 1220 are not only coupled to one another via data bus 1230 and result bus 1240, but are also communicatively coupled to one another by a communications link 1270.

When a packet is received, the packet is identified and analyzed by a network router element such as network router element 1200 in the following manner, according to embodiments of the present invention. Upon receipt, a packet (or some or all of its control information) is sent from the one of port processors 1250(1,1)-(N,N) at which the packet was received to one or more of those devices coupled to data bus 1230 (e.g., others of port processors 1250(1,1)-(N,N), forwarding engine 1210 and/or processor 1220). Handling of the packet can be determined, for example, by forwarding engine 1210. For example, forwarding engine 1210 may determine that the packet should be forwarded to one or more of port processors 1250(1,1)-(N,N). This can be accomplished by indicating to corresponding one(s) of port processor controllers 1260(1)-(N) that the copy of the packet held in the given one(s) of port processors 1250(1,1)-(N,N) should be forwarded to the appropriate one of port processors 1250(1,1)-(N,N).

In the foregoing process, network security information can be included in a frame sourced by network routing device 1200 in a number of ways. For example, forwarding engine 1210 can be used to detect the need for the inclusion of network security information in the packet, and processor 1220 can be called into service to provide the requisite network security information. This network security information can be included in the packet during the transfer of the packet's contents from one of port processors 1250(1,1)-(N,N) to another of port processors 1250(1,1)-(N,N), by processor 1220 providing the requisite information directly, or via forwarding engine 1210, for example. The assembled packet at the receiving one of port processors 1250(1,1)-(N,N) can thus be made to contain the requisite network security information.

In addition, or alternatively, once a packet has been identified for processing according to the present invention, forwarding engine 1210, processor 1220 or the like can be used to process the packet in some manner or add packet security information, in order to secure the packet. On a node sourcing such a packet, this processing can include, for example, encryption of some or all of the packet's information, the addition of a digital signature or some other information or processing capable of securing the packet. On a node receiving such a processed packet, the corresponding process is performed to recover or validate the packet's information that has been thusly protected.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 1010). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
 receiving a join message for a first multicast datastream and a reverse path forwarding label (RPF-label), wherein
  the join message and the RPF-label are received at an ingress edge router of an MPLS (multiprotocol label switching) network;
 associating the RPF-label and the first multicast datastream;
 receiving a multicast packet of the first multicast datastream; and transmitting the multicast packet with the RPF-label, wherein
the multicast packet and the RPF-label are transmitted toward an egress edge router of the MPLS network,
the RPF-label is associated with a first virtual interface at the egress edge router, and
the egress edge router is configured to perform an RPF check on the multicast packet using the first virtual interface as a receiving interface.

2. The method of claim 1, wherein the associating the RPF-label and the first multicast datastream comprises:
storing the RPF-label and a multicast address in a table, wherein
the multicast address is identified in the join message, and
the table comprises one or more RPF-labels and associated one or more multicast addresses.

3. The method of claim 1, further comprising:
performing a lookup in a table, in response to the receiving the multicast packet, wherein
a multicast address associated with the multicast packet is used in the lookup, and
the lookup results in the RPF-label.

4. The method of claim 3, further comprising:
receiving a second multicast packet of a second multicast datastream; and
performing a second lookup in the table, in response to the receiving the second multicast packet, wherein
a second multicast address associated with the second multicast packet is used in the second lookup,
the second lookup results in a second RPF-label, and
the second RPF-label is associated with the second multicast datastream.

5. The method of claim 1, wherein the transmitting the multicast packet with the first RPF-label comprises:
incorporating the multicast packet and the RPF-label in a transport network frame; and
label-switching the transport network frame toward the egress edge router, using a label distribution protocol allocated (LDP-allocated) label, wherein
the LDP-allocated label is distinct from the RPF-label.

6. The method of claim 5, wherein
the transport network frame is transmitted to a non-multicast-enabled network element.

7. The method of claim 1, further comprising:
receiving a second join message for a second multicast datastream and a second RPF-label; and
associating the second RPF-label and the second multicast datastream.

8. The method of claim 1, wherein
the join message is a protocol independent multicast (PIM) JOIN for the first multicast datastream.

9. The method of claim 1, wherein
the egress edge router sent the join message and the RPF-label to the ingress edge router, and
the egress edge router is coupled to a multicast subscriber of the first multicast datastream.

10. A network edge router apparatus comprising:
a plurality of network line cards, wherein
a first network line card of the plurality of network line cards is configured to
receive a join message for a first multicast datastream and a reverse path forwarding label (RPF-label), wherein
the network edge router apparatus comprises an ingress edge router of an MPLS (multiprotocol label switching) network,
a second network line card of the plurality of network line cards is configured to
receive a multicast packet of the first multicast datastream, and
the first network line card is further configured to
transmit the multicast packet with the RPF-label, wherein
the multicast packet and the RPF-label are transmitted toward an egress edge router of the MPLS network,
the RPF-label is associated with a first virtual interface at the egress edge router, and
the egress edge router is configured to perform an RPF check on the multicast packet using the first virtual interface as a receiving interface;
a switch fabric comprising a plurality of ports, wherein
each of the plurality of ports is coupled to a corresponding one of the plurality of network line cards; and
one or more processors coupled to the first and second network line cards, wherein
the one or more processors are configured to
associate the RPF-label and the first multicast datastream, in response to receipt of the RPF-label and the join message, and
provide the multicast packet and the RPF-label to the first network line card, in response to receipt of the multicast packet.

11. The network edge routing apparatus of claim 10, wherein
the one or more processors are further configured to
store the RPF-label and a multicast address in a table, wherein
the multicast address is identified in the join message.

12. The network edge routing apparatus of claim 10, wherein
the one or more processors are configured to
perform a lookup in a table, in response to receipt of the multicast packet, wherein
a multicast address associated with the multicast packet is used in the lookup, and
the lookup results in the RPF-label.

13. The network edge routing apparatus of claim 12, wherein
the first network line card is further configured to
receive a second multicast packet of a second multicast datastream; and
the one or more processors are further configured to
perform a second lookup in the table, in response to receipt of the second multicast packet, wherein
a second multicast address associated with the second multicast packet is used in the lookup,
the second lookup results in a second RPF-label, and
the second RPF-label is associated with the second multicast datastream.

14. The network edge routing apparatus of claim 10, wherein
the one or more processors are configured to
incorporate the multicast packet and the RPF-label in a transport network frame, and
provide the transport network frame to the second network line card; and
the second network line card is further configured to
label-switch the transport network frame toward the egress edge router, using a label distribution protocol allocated (LDP-allocated) label, wherein
the LDP-allocated label is distinct from the RPF-label.

15. The network edge routing apparatus of claim 10, wherein
- the first network line card is further configured to
  - receive a second join message for a second multicast datastream and a second RPF-label; and
- the one or more processors are configured to
  - associate the second RPF-label and the second multicast datastream, in response to receipt of the second RPF-label and the second join message.

16. The network edge routing apparatus of claim 10, wherein
- the egress edge router sent the join message and the RPF-label to the network edge routing apparatus, and
- the egress edge router is coupled to a multicast subscriber of the first multicast datastream.

17. A network edge routing apparatus comprising:
- a plurality of ports, wherein
  - a first port of the plurality of ports is configured to
    - receive a message requesting a first multicast datastream and a reverse path forwarding label (RPF-label), wherein
    - the network edge routing apparatus comprises an ingress edge
      - routing apparatus of an MPLS (multiprotocol label switching) network,
  - a second port of the plurality of ports is configured to
    - receive a multicast packet of the first multicast datastream, and
  - the first port is further configured to transmit the multicast packet with the RPF-label, wherein
    - the multicast packet and the RPF-label are transmitted toward an egress edge routing apparatus of the MPLS network,
    - the RPF-label is associated with a first virtual interface at the egress edge routing apparatus, and
    - the egress edge routing apparatus is configured to perform an RPF check on the multicast packet using the first virtual interface as a receiving interface;
- one or more processors coupled to the first and second ports; and
- a memory coupled to the one or more processors, the memory storing instructions executable by the one or more processors, wherein the instructions are configured to
  - associate the RPF-label and the first multicast datastream, in response to receipt of the RPF-label and the message, and
  - provide the multicast packet and the RPF-label to the first port, in response to receipt of the multicast packet.

18. The network edge routing apparatus of claim 17, wherein
- the instructions are further configured to:
  - store the RPF-label and a multicast address in the memory, wherein
    - the multicast address is identified in the message requesting the first multicast datastream.

19. The network edge routing apparatus of claim 17, wherein
- the instructions are further configured to:
  - perform a lookup in a table, in response to receipt of the multicast packet, wherein
    - a multicast address associated with the multicast packet is used in the lookup, and
    - the lookup results in the RPF-label.

20. The network edge routing apparatus of claim 17, wherein
- the instructions are further configured to:
  - incorporate the multicast packet and the RPF-label in a transport network frame, and
  - provide the transport network frame to the second port; and
- the second port is further configured to
  - label-switch the transport network frame toward the egress edge routing apparatus, using a label distribution protocol allocated (LDP-allocated) label, wherein
    - the LDP-allocated label is distinct from the RPF-label.

21. The method of claim 1, wherein
the first virtual interface is associated with the first multicast datastream.

* * * * *